(12) United States Patent
Field et al.

(10) Patent No.: US 7,571,199 B1
(45) Date of Patent: Aug. 4, 2009

(54) METHOD AND APPARATUS FOR GENERATING RANDOM NUMBERS

(75) Inventors: Scott A. Field, Redmond, WA (US); Jeffrey F. Spelman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 09/714,781

(22) Filed: Nov. 15, 2000

(51) Int. Cl.
*G06F 7/58* (2006.01)
(52) U.S. Cl. .................................................. 708/250
(58) Field of Classification Search ................. 708/254, 708/250
See application file for complete search history.

(56) References Cited

U.S. PATENT DOCUMENTS

| | | | |
|---|---|---|---|
| 4,118,788 A | 10/1978 | Roberts | 364/900 |
| 5,005,200 A | 4/1991 | Fischer | 380/30 |
| 5,432,852 A | 7/1995 | Leighton et al. | 380/30 |
| 5,465,353 A | 11/1995 | Hull et al. | 395/600 |
| 5,608,801 A | 3/1997 | Aiello et al. | 380/46 |
| 5,778,069 A | 7/1998 | Thomlinson et al. | 380/25 |
| 6,044,388 A * | 3/2000 | DeBellis et al. | 708/254 |
| 6,061,703 A * | 5/2000 | DeBellis et al. | 708/254 |
| 6,104,810 A * | 8/2000 | DeBellis et al. | 380/43 |
| 6,317,499 B1 * | 11/2001 | Hillyer et al. | 380/59 |

OTHER PUBLICATIONS

William Aiello and Ramarathnam Venkatesan, "Foiling Birthday Attacks in Length-Doubling Transformations," Advances in Cryptology—Eurocrypt '96, May 12-16, 1996, pp. 307-320.

Karthik Visweswariah et al., "Source Codes as Random Number Generators," *IEEE Transactions on Information Theory*, vol. 44, No. 2, Mar. 1998, pp. 462-471.

Sridhar Vembu et al., "Generating Random Bits from an Arbitrary Source: Fundamental Limits," *IEEE Transactions on Information Theory*, vol. 41, No. 5, Sep. 1995, pp. 1322-1332.

Manuel Cerecedo et al., "Shared Pseudo-Random Secret Generation Protocols," *IEICE Trans. Fundamentals.*, vol. E77-A, No. 4, Apr. 1994, pp. 636-645.

Te Sun Han et al., "Source Code with Cost as a Nonuniform Random Number Generator," *IEEE Transactions on Information Theory*, vol. 46, No. 2, Mar. 2000, pp. 712-717.

Jean-Sebastien Coron, "On the Security of Random Sources," Public Key Cryptography, Second International Workshop on Practice and Theory in Public Key Cryptography, PKC'99. Proceedings pp. 29-42.

F. Warren Burton et al., "Distributed random number generation," *J. Functional Programming* 9(2): 203-212, Apr. 1992.

IBM Technical Disclosure Bulletin "High Work Factor Hash Total"; vol. 25, No. 1; Svigals, J., Jun. 1982.

* cited by examiner

*Primary Examiner*—David H Malzahn
(74) *Attorney, Agent, or Firm*—Lee & Hayes, PLLC

(57) ABSTRACT

A system collects entropy data and stores the entropy data in a nonvolatile memory. The entropy data stored in the nonvolatile memory is updated with newly collected entropy data. The entropy data stored in the nonvolatile memory is used to generate a string of random bits. The entropy data is collected from multiple sources within a computer system and may include data related to a processor in the computer system and an operating system executing on the computer system. The entropy data is maintained in a protected portion of an operating system kernel. A hashing algorithm is applied to the entropy data to generate random seed data.

17 Claims, 4 Drawing Sheets

METHOD AND APPARATUS FOR GENERATING RANDOM NUMBERS

TECHNICAL FIELD

The present invention relates to random number generators and, more particularly, to computer-implemented random number generators that create strings of random bits.

BACKGROUND

Random number generation is an important part of the security infrastructure in many application programs and operating systems. For example, random numbers are used to generate session keys and cryptographic keys for encoding data that is transmitted between two locations (such as between a client and a server). The use of such keys protects the integrity of the data and provides for the authentication of the data and authentication of the user attempting to access the data.

The quality of the random numbers generated is associated with the quality of the security provided by the application program or operating system. A perfect random number generator that produces a truly random sequence of bits is considered by many to be impossible. Thus, designers attempt to create "pseudo" random number generators that produce unpredictable sequences of bits in which no particular bit is more likely to be generated at a given time or place in the sequence than any other bit. This disclosure uses the terms "random number generator" and "pseudo random number generator" interchangeably.

The quality of the random seed used by the random number generator affects the quality of the random number created by the random number generator. Common techniques for creating a random seed include using operating parameters of the computer, such as time of day, date, available memory, and the like. In general, these types of parameters are regarded as sufficient for certain types of simple applications, but can lead to predictability in certain situations. For example, systems that use the computer's system time as the random seed can be predicted if the approximate system time is known, such as the time at which an email was generated. An analyst could test all possible times near the known approximate system time until the seed for the random number is discovered, thereby breaking the security of the system.

Many existing random number generation systems use data that is reset each time the computer system is reset, thereby limiting the quality of the seed data. Other random number generation systems use data that may be similar from one computer system to the next, such as time of day or date, thereby reducing the randomness of the seed data.

The system and method described herein addresses these limitations by providing a random number generator that uses random seed data that has been generated over the lifetime of the computer system.

SUMMARY

The system and methods described herein provide a computer-implemented random number generator that creates strings of random bits using entropy data that is collected over the lifetime of the computer system. The quality of this entropy data (i.e., the randomness of the data) is improved as compared to systems that use entropy data that is reset each time the computer or application program is restarted. Further, the system and methods described herein collect entropy data from multiple sources, thereby reducing the likelihood that two computer systems will have the same entropy data. Thus, the systems and methods described herein generate random numbers having an improved quality.

In one embodiment, entropy data is collected and stored in a nonvolatile memory. The entropy data stored in the nonvolatile memory is updated with newly collected entropy data. A string of random bits is generated from the entropy data stored in the nonvolatile memory.

In a described embodiment, the entropy data is collected from multiple sources within a computer system.

In a particular embodiment, the entropy data includes data related to a processor in a computer system and data related to an operating system executing on the computer system.

In a described implementation, the entropy data is maintained in a protected portion of an operating system kernel such that the entropy data is inaccessible to application programs executing on the system.

In one embodiment, generating a string of random bits includes hashing the entropy data to generate random seed data.

A particular embodiment includes communicating the string of random bits to an application program requesting a random number.

DETAILED DESCRIPTION

The system and methods described herein provide a random number generator that creates strings of random bits using entropy data that is collected over the lifetime of the computer system. Entropy data refers to the data (such as computer system state information) used as a random seed for the random number generator. Using data that is collected over the lifetime of the computer system improves the quality of the resulting random numbers because the data is not reset each time the computer system or application program is restarted. The collected data continues to change as additional operations, functions, and application programs are executed on the computer system. As time passes, the likelihood that two different computer systems would produce the same entropy data is reduced.

Figure 1:
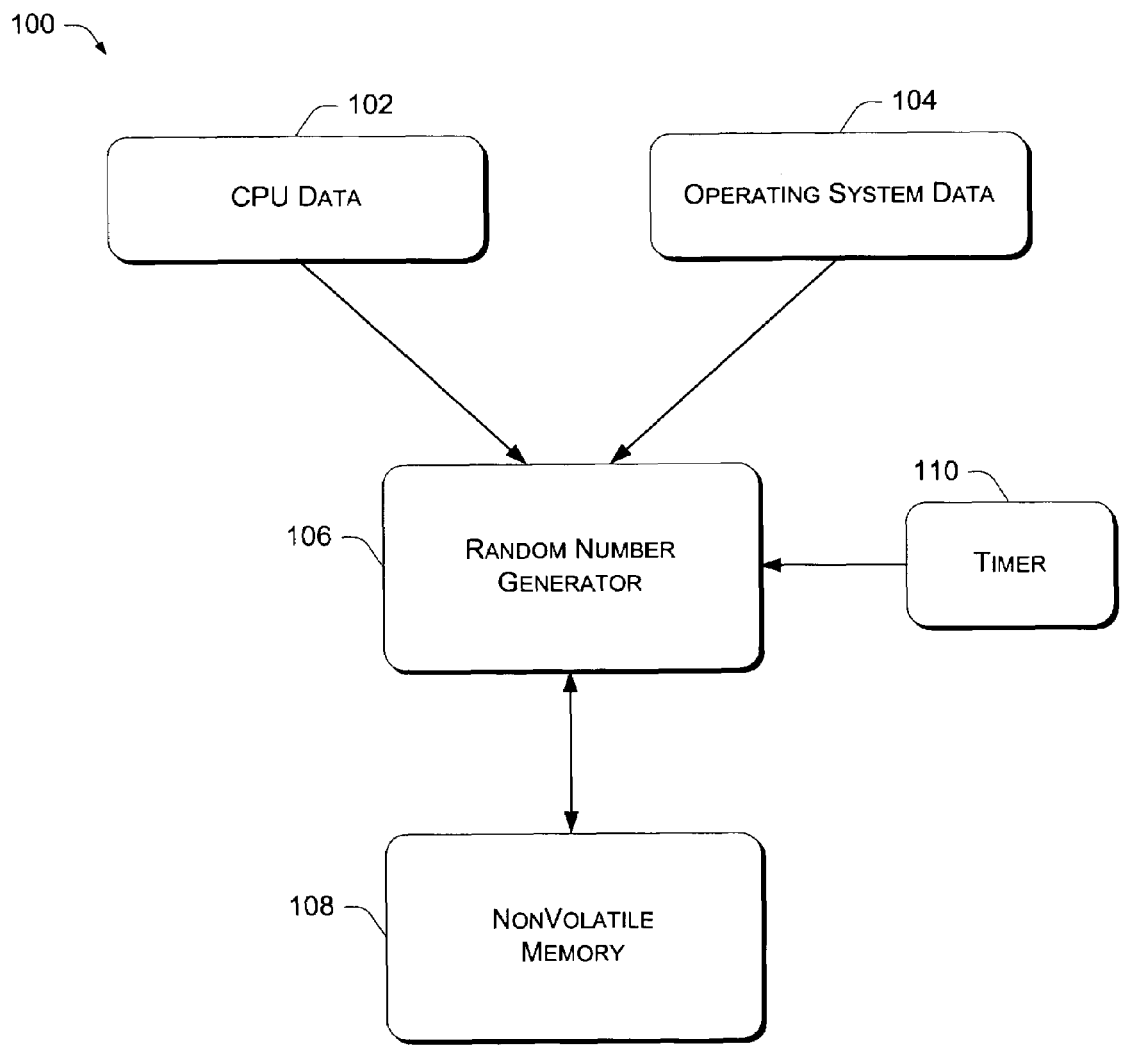
FIG. 1 illustrates a block diagram of a system that collects and stores entropy data and generates strings of random bits based on the entropy data.

FIG. 1 illustrates a block diagram of a system 100 that collects and stores entropy data and generates strings of random bits based on the entropy data. In a particular embodiment, the system 100 is contained within a computer system. The entropy data collected includes central processing unit (CPU) data 102 and operating system data 104. CPU data 102 includes various CPU state information and operating system data 104 includes various operating system state information. Table 1 below illustrates exemplary CPU data 102 and operating system data 104.

TABLE 1

| CPU Data | Operating System Data |
|---|---|
| timestamp counter | boot time |
| cache misses per second | time of day |
| branch mispredictions per second | time zone bias |
| CPU-specific counters | page size |
| | number of processors |
| | current cache size |
| | peak cache size |
| | I/O read operation count |
| | I/O write operation count |
| | cache read count |

The CPU data 102 may vary from one CPU to the next. For example, many of the internal counters in a CPU are affected by power fluctuations, the types of operations performed by the CPU, and the clock speed at which the CPU is operating.

A random number generator 106 receives the collected CPU data 102 and operating system data 104. The random number generator 106 stores the collected data in a nonvolatile memory 108, such as a hard disk, floppy disk, flash memory device or an EEPROM. Since the data is stored in the nonvolatile memory 108, the data is available to the random number generator 106 after a computer system restart. Thus, the data is collected and stored over the operating lifetime of the computer system. The random number generator 106 is capable of processing the CPU data 102 and the operating system data 104 to generate a string of random bits (or bytes). Periodically, the random number generator 106 retrieves current CPU data 102 and current operating system data 104. This current data is used to update the data stored in nonvolatile memory 108, thereby modifying the seed data used by the random number generator 106. In one embodiment, the data stored in nonvolatile memory 108 is updated at regular time intervals, as controlled by a timer 110. In another embodiment, the data stored in nonvolatile memory 108 is updated after a particular number of requests for random numbers (e.g., after every tenth request for a random number).

In a particular embodiment, a system device driver resides in the operating system kernel and generates random numbers at the request of an application program or other function accessing the device driver. This device driver is responsible for collecting and maintaining entropy data as discussed herein. An application programming interface (API) is provided to allow application programs to request a random number. The API communicates random number requests to the device driver, which generates a random number (a string of random bits or bytes) based on the entropy data. In a particular implementation, application programs use the RtlGenRandom( ) API provided by the Windows® operating system, developed by Microsoft Corporation of Redmond, Wash. The RtlGenRandom( ) API communicates with the device driver via the Win32® application programming interface call DeviceIoControl( ), which is a commonly used API call for communicating with device drivers in the Windows® operating system.

As discussed below, the device driver applies a hash function to the various entropy data collected. The result of the hash function is used as the random seed for the random number generator. The entropy data and the random seed data are maintained in a protected portion of the operating system kernel (i.e., a portion of the operating system kernel that is not accessible by an application program). Maintaining the entropy data and the random seed data in a protected portion of the operating system kernel prevents an application program from predicting or deriving random numbers issued to another application program on the same computer system. In a particular embodiment, the device driver manages the memory used to store the entropy data and the random seed data. In this embodiment, entropy data is maintained in the operating system kernel as well as the non-volatile Windows® registry.

A typical computer system has multiple processes executing simultaneously, one or more of which may require random numbers. The system and methods described herein allow the generation of multiple random numbers for use as session keys, cryptographic keys, and the like. Although particular embodiments are discussed with reference to a device driver residing in the operating system kernel that generates random numbers, it will be appreciated that any type of software component and/or firmware component can be used to implement the random number generator.

Figure 2:
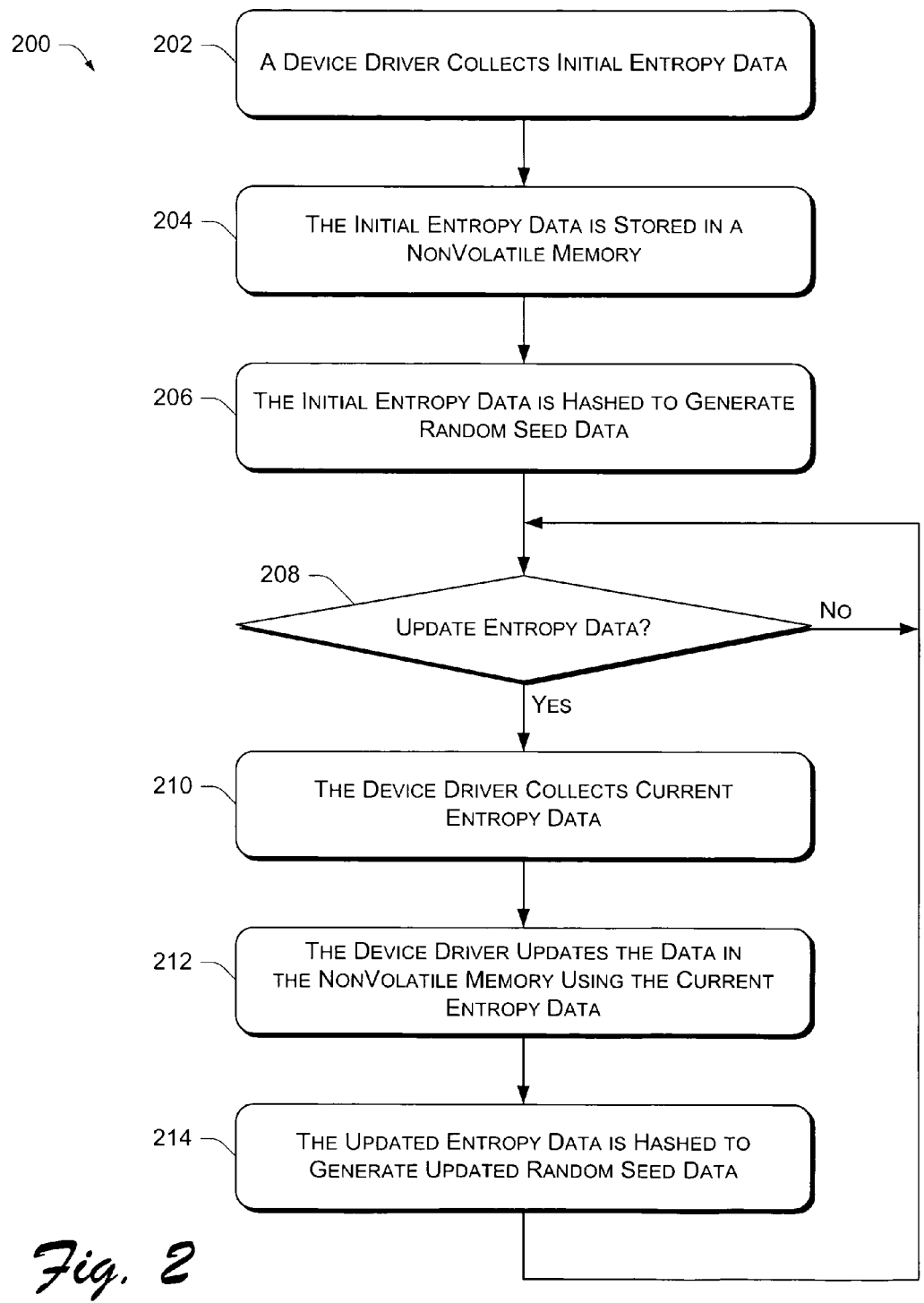
FIG. 2 is a flow diagram illustrating a procedure for collecting, storing, and updating entropy data.

FIG. 2 is a flow diagram illustrating a procedure 200 for collecting, storing, and updating entropy data. When a system is first initialized, a device driver collects initial entropy data from the CPU and the operating system (block 202). The initial entropy data is then stored in a nonvolatile memory (block 204), such as nonvolatile memory 108 in FIG. 1. The initial entropy data is hashed to generate random seed data for the random number generator (block 206). The hashed data may be stored in a register or other storage location that is accessible to the random number generator, but inaccessible to application programs executing on the system. Any hashing algorithm that produces a long string of bits can be used to hash the entropy data. An example hashing algorithm is described in U.S. Pat. No. 5,778,069, the disclosure of which is incorporated by reference herein. In an alternate embodiment, two or more different hashing algorithms are applied to the same set of entropy data and the results are concatenated together into a single string of bits representing the random seed data.

At block 208 in FIG. 2, the procedure 200 determines whether to update the entropy data. The entropy data may be updated at periodic intervals (e.g., every fifteen minutes) or after generating a particular number of random numbers (e.g., after every tenth random number is generated). Alternatively, an application program may specifically request an update of the entropy data. A particular implementation updates the data the first time that an application program makes a request for a random number. If the entropy data needs to be updated, then the procedure continues to block 210, where the device driver collects the current entropy data (i.e., the CPU data and the operating system data). After collecting the current entropy data, the device driver updates the data in the nonvolatile memory by replacing the previous entropy data with the new entropy data (block 212). Alternatively, the device driver may update the data in the nonvolatile memory by hashing the previous entropy data with the new entropy data (this process may be referred to as "chaining"). Finally, the updated entropy data is hashed to generate updated random seed data (block 214). The resulting random seed data overwrites the previous seed data stored in a register or other storage location. The procedure 200 then returns to block 208 to await the next update of the entropy data.

When a system is first initialized (i.e., no entropy data is stored in the nonvolatile memory), the procedure shown in FIG. 2 is executed beginning at block 202. However, when a system is reset or rebooted (i.e., entropy data is already stored in the nonvolatile memory), then the procedure shown in FIG. 2 is executed beginning at block 210. Thus, resetting or rebooting a system does not cause the deletion of any previously stored entropy data. The entropy data stored in the nonvolatile memory is continually updated over the life of the system, thereby providing continually changing entropy data and higher quality random numbers generated from the entropy data.

Figure 3:
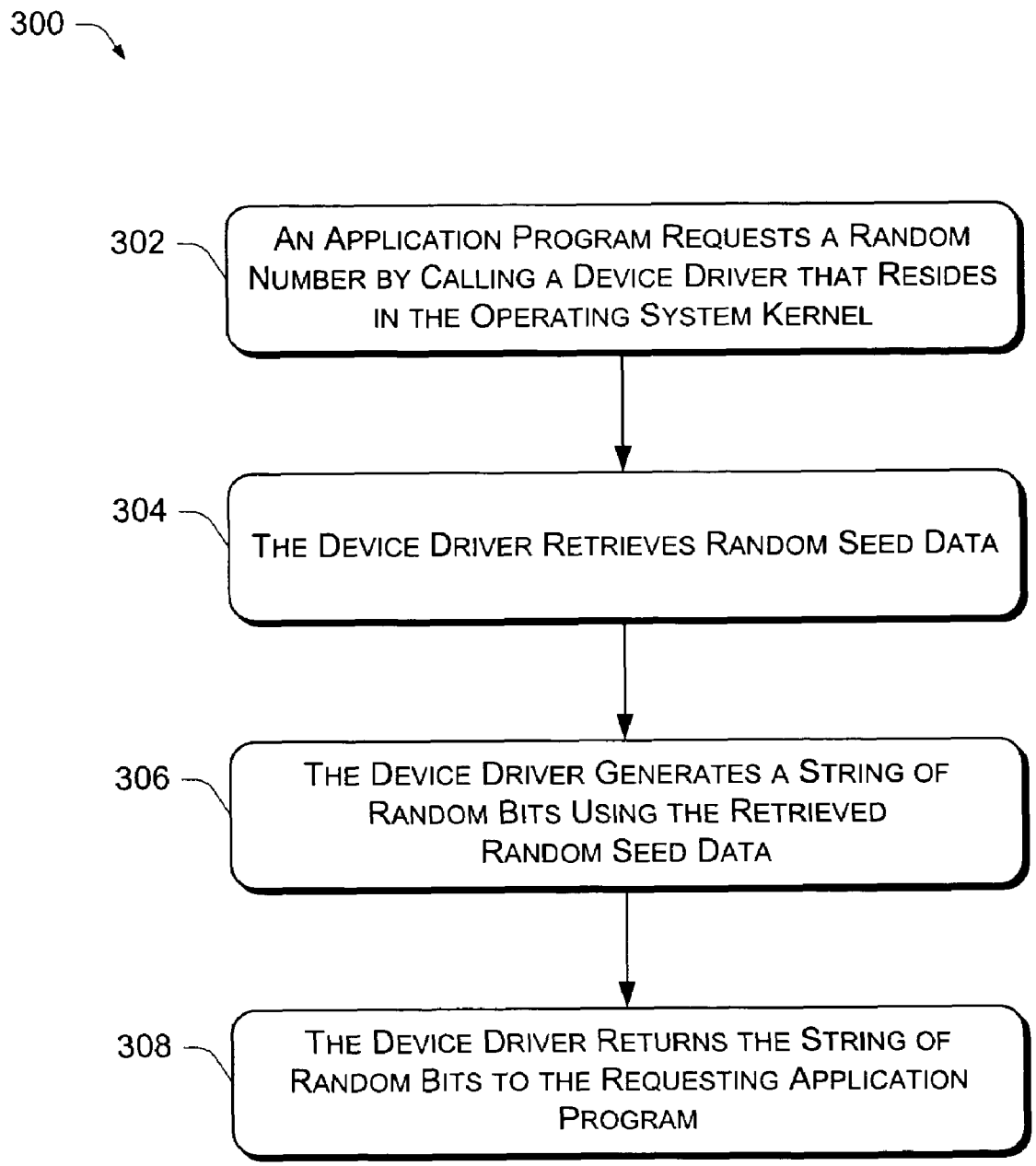
FIG. 3 is a flow diagram illustrating a procedure for generating a string of random bits at the request of an application program.

FIG. 3 is a flow diagram illustrating a procedure 300 for generating a string of random bits at the request of an application program. An application program requests a random number by calling a device driver (via an API) that resides in the operating system kernel (block 302). The device driver retrieves the random seed data previously produced from the entropy data using a hash algorithm (block 304). The random seed data is retrieved, for example, from a register or other storage location. Next, the device driver generates a string of random bits using the retrieved random seed data (block 306). Finally, the device driver returns the string of random bits to the requesting application program (block 308).

In a particular embodiment, the entropy data is hashed to produce a 640 bit hash, which is the seed data for the random number generator. The random number generator uses the 640 bit hash to generate a 256 byte random number, which is also referred to as a "key." The 256 byte random number can be used as a session key, a cryptographic key, or in any other situation requiring a random number. In one implementation, the RSA RC4 stream cipher (available from RSA Security of Bedford, Mass.) is used to generate a 256 byte random number from the 640 bit hash.

Although particular implementations have been described above with reference to specific stream ciphers, other types of ciphers can be used to generate a random number from the 640 bit hash. Further, the 640 bit hash and the 256 byte random numbers represent an exemplary embodiment. The system and methods described herein can be used with a hash (i.e., seed data) of any size to generate a random number having any number of bits (or bytes).

Figure 4:
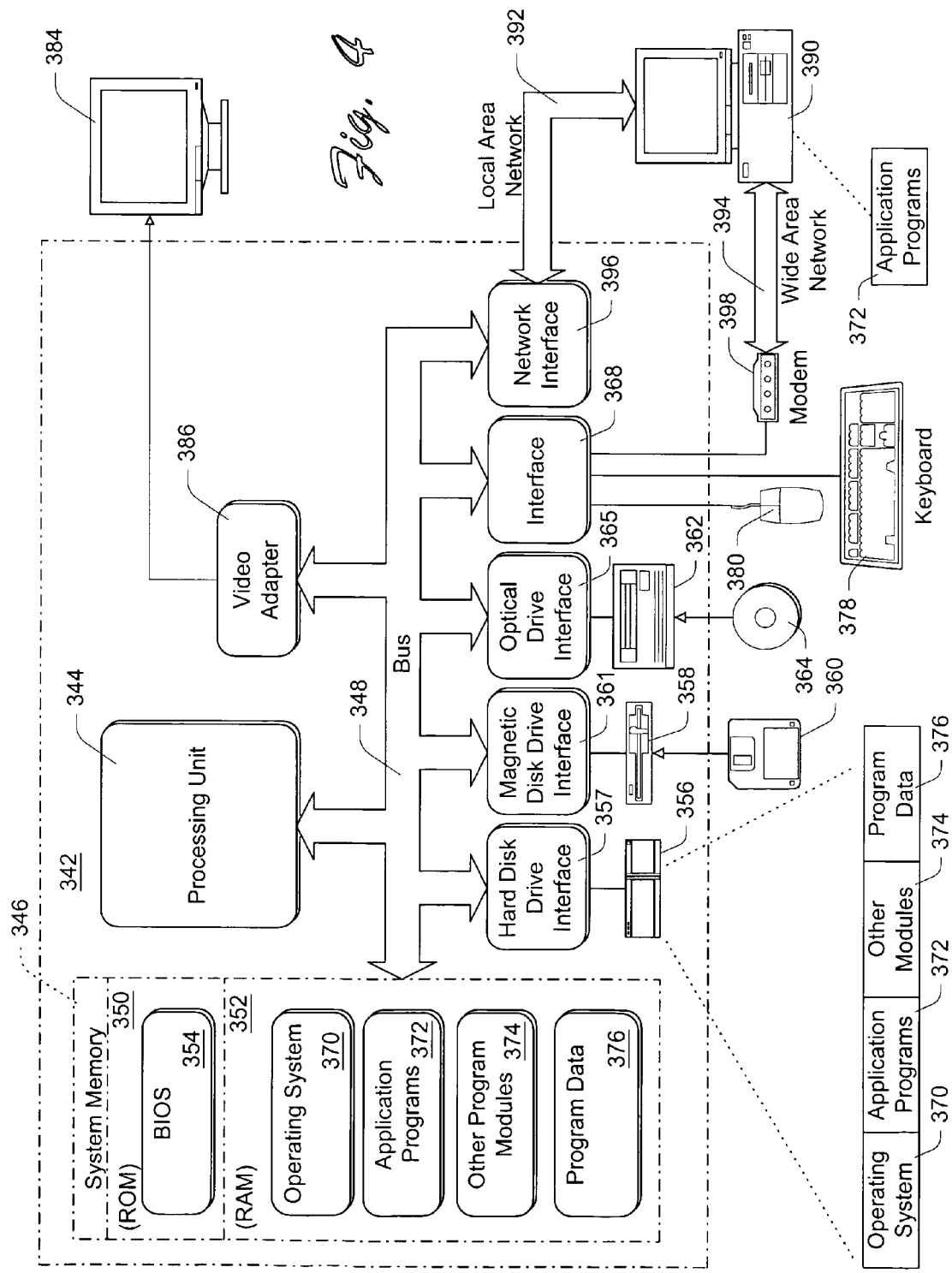
FIG. 4 illustrates an example of a suitable operating environment in which the random number generator may be implemented.

FIG. 4 illustrates an example of a suitable operating environment in which the random number generator may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 4 shows a general example of a computer 342 that can be used in accordance with the invention. Computer 342 is shown as an example of a computer that can perform the hashing and random number generation functions described herein. Computer 342 includes one or more processors or processing units 344, a system memory 346, and a bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory 346 includes read only memory (ROM) 350 and random access memory (RAM) 352. A basic input/output system (BIOS) 354, containing the basic routines that help to transfer information between elements within computer 342, such as during start-up, is stored in ROM 350. Computer 342 further includes a hard disk drive 356 for reading from and writing to a hard disk, not shown, connected to bus 348 via a hard disk drive interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from and/or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus (e.g., a serial port interface, a parallel port interface, a universal serial bus (USB) interface, etc.). A monitor 384 or other type of display device is also connected to the system bus 348 via an interface, such as a video adapter 386. In addition to the monitor, personal computers typically include other peripheral output devices (not shown) such as speakers and printers.

Computer 342 operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 4. The logical connections depicted in FIG. 4 include a local area network (LAN) 392 and a wide area network (WAN) 394. Such networking environments are commonplace in offices, enterprise-wide computer networks, intranets, and the Internet. In certain embodiments, computer 342 executes an Internet Web browser program (which may optionally be integrated into the operating system 370) such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 typically includes at least some form of computer readable media. Computer readable media can be any available media that can be accessed by computer 342. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 342. Communication media typically embodies computer readable instructions, data structures, program modules and includes any information delivery media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Thus, a system and method has been described that generate random numbers based on entropy data collected over the lifetime of the computer system. The entropy data is maintained in a persistent storage device and can be updated at regular intervals.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   collecting initial entropy data, wherein the initial entropy data includes central processing unit data and operating system data, wherein the central processing unit data comprises:
   (i) a timestamp counter;
   (ii) a number of cache misses per second;
   (iii) a number of branch mispredictions per second;
   (iv) power fluctuations;
   (v) a clock speed at which a central processing unit (CPU) is running; or
   (vi) CPU-specific counters;
   storing the initial entropy data in a nonvolatile memory;
   updating the initial entropy data stored in the nonvolatile memory with newly collected entropy data; and
   generating a string of random bits from the updated entropy data stored in the nonvolatile memory, wherein generating a string of random bits includes:
   (i) producing a first result by hashing the updated entropy data with a first hashing algorithm;
   (ii) producing a second result by hashing the updated entropy data with a second hashing algorithm that is different from the first hashing algorithm; and
   (iii) concatenating the first result with the second result.

2. A method as recited in claim 1 wherein the initial entropy data includes operating system state information.

3. A method as recited in claim 1 wherein the initial entropy data is maintained in a protected portion of an operating system kernel.

4. A method as recited in claim 1 wherein the method is executing on a system and the initial entropy data is inaccessible by an application program executing on the system.

5. A method as recited in claim 1 wherein updating the initial entropy data stored in the nonvolatile memory includes collecting new entropy data at periodic intervals.

6. A method as recited in claim 1 further including communicating the string of random bits to an application program requesting a random number.

7. One or more computer-readable memories containing a computer program that is executable by one or more processors, the computer program causing the one or more processors to:
   collect initial entropy data, wherein the initial entropy data includes central processor unit data and operating system data;
   store the initial entropy data in a nonvolatile memory;
   update the initial entropy data stored in the nonvolatile memory with newly collected entropy data; and
   generate a string of random bits from the updated entropy data stored in the nonvolatile memory, wherein generating a string of random bits includes:
   (i) producing a first result by hashing the updated entropy data with a first hashing algorithm;
   (ii) producing a second result by hashing the updated entropy data with a second hashing algorithm that is different from the first hashing algorithm; and
   (iii) concatenating the first result with the second result.

8. One or more computer-readable memories containing a computer program that is executable by one or more processors, the computer program causing the one or more processors to:
   receive a request for a random number;
   retrieve, from a protected portion of an operating system kernel, initial entropy data that is regularly updated with newly collected entropy data, wherein the initial entropy data includes central processing unit data and operating system data;
   generate a string of random bits, wherein generating a string of random bits includes:
   (i) producing a first result by hashing the updated entropy data with a first hashing algorithm;
   (ii) producing a second result by hashing the updated entropy data with a second hashing algorithm that is different from the first hashing algorithm; and
   (iii) concatenating the first result with the second result; and
   communicate the string of random bits to the requester of the random number.

9. A method as recited in claim 8 wherein the central processing unit data includes data related to a state of a processor in a computer system and operating system data includes the state of an operating system executing on the computer system.

10. A method as recited in claim 8 wherein the updated entropy data is inaccessible by the requester of the random number.

11. An apparatus comprising:
- a nonvolatile memory configured to store initial entropy data, wherein the initial entropy data stored in the nonvolatile memory is updated regularly with newly collected entropy data; and
- a random number generator, coupled to the nonvolatile memory, wherein the random number generator utilizes the updated entropy data stored in the nonvolatile memory to generate strings of random bits, wherein generating a string of random bits includes:
  - (i) producing a first result by hashing the updated entropy data with a first hashing algorithm;
  - (ii) producing a second result by hashing the updated entropy data with a second hashing algorithm that is different from the first hashing algorithm; and
  - (iii) concatenating the first result with the second result.

12. An apparatus as recited in claim 11 wherein the initial entropy data is updated at periodic intervals.

13. An apparatus as recited in claim 11 wherein the updated entropy data is maintained in a protected portion of an operating system kernel such that the entropy data is inaccessible by an application program.

14. An apparatus as recited in claim 11 further including a timer coupled to the random number generator, the timer indicating when to update the updated entropy data stored in the nonvolatile memory device.

15. One or more computer storage media having stored thereon a computer program that, when executed by one or more processors, causes the one or more processors to:
- collect entropy data from the one or more processors and one or more operating systems executed by the one or more processors;
- store the collected entropy data in a nonvolatile memory;
- update the entropy data stored in the nonvolatile memory with newly collected entropy data; and
- produce a string of random bits from the entropy data stored in the nonvolatile memory, wherein producing a string of random bits includes:
  - (i) producing a first result by hashing the updated entropy data with a first hashing algorithm;
  - (ii) producing a second result by hashing the updated entropy data with a second hashing algorithm that is different from the first hashing algorithm; and
  - (iii) concatenating the first result with the second result; and
- wherein the entropy data from the one or more processors comprises:
  - (i) a timestamp counter;
  - (ii) a number of cache misses per second;
  - (iii) a number of branch mispredictions per second;
  - (iv) power fluctuations;
  - (v) a clock speed at which a processor is running; or
  - (vi) one or more processors-specific counters.

16. One or more computer storage media as recited in claim 15 wherein the entropy data is maintained in a protected portion of an operating system kernel.

17. One or more computer storage media as recited in claim 15 wherein the entropy data stored in the nonvolatile memory is updated with newly collected entropy data at periodic intervals.

* * * * *